United States Patent
Steinmetz et al.

(10) Patent No.: US 6,696,656 B2
(45) Date of Patent: Feb. 24, 2004

(54) METHOD OF PROCESSING RETURN TO SENDER MAILPIECES USING VOICE RECOGNITION

(75) Inventors: John H Steinmetz, Bridgeport, CT (US); James Giordano, Danbury, CT (US); Robert K. Gottlieb, Milford, CT (US); Joseph D Mallozzi, Trumbull, CT (US); William E. Ryan, Monroe, CT (US); Edward P. Daniels, Jr., Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 8 days.

(21) Appl. No.: 09/996,536

(22) Filed: Nov. 28, 2001

(65) Prior Publication Data

US 2003/0098265 A1 May 29, 2003

(51) Int. Cl.$^7$ .............................. B07C 5/00; G06K 9/00
(52) U.S. Cl. ..................... 209/584; 209/900; 700/224; 700/227; 700/228
(58) Field of Search ................ 209/584, 900; 700/224–228

(56) References Cited

U.S. PATENT DOCUMENTS

| | | | |
|---|---|---|---|
| 4,632,252 A | 12/1986 | Haruki et al. ............... 209/546 |
| 4,992,649 A | 2/1991 | Mampe et al. .............. 235/462 |
| 5,538,138 A | 7/1996 | Reich ......................... 209/3.3 |
| 5,677,834 A * | 10/1997 | Mooneyham ................ 700/83 |
| 5,697,504 A | 12/1997 | Hiramatsu et al. .......... 209/546 |
| 5,734,568 A | 3/1998 | Borgendale et al. ........ 364/409 |
| 5,881,890 A * | 3/1999 | Wiley ......................... 209/703 |
| 5,995,936 A * | 11/1999 | Brais et al. ................. 704/275 |
| 6,394,278 B1 * | 5/2002 | Reed .......................... 209/44.4 |
| 6,610,955 B2 * | 8/2003 | Lopez ......................... 209/584 |

\* cited by examiner

*Primary Examiner*—Donald P. Walsh
*Assistant Examiner*—Jonathan R Miller
(74) *Attorney, Agent, or Firm*—Christopher J. Capelli; Angelo N. Chaclas

(57) ABSTRACT

An embodiment of the present invention comprises a mailpiece sorting apparatus including a voice recognition system performing a method of processing "return to sender" mailpieces using voice recognition. The operator obtains a "return to sender" mailpiece and determines a sender address segment for identification. The sender address segment is spoken by the operator to the recognition system. The voice recognition software interprets the information and communicates it to recipient matching software. The software narrows the potential sender matches in the mailpiece sorting apparatus addressee database. If a match is made, the operator is prompted to place the mailpiece onto mailpiece sorting apparatus which sends the mailpiece to the proper sort bin based on the identification performed by the matching software. The present invention may also calculate statistical information regarding reject mailpieces and chargeback information for the cost of sorting the "return to sender" mailpiece.

1 Claim, 7 Drawing Sheets

METHOD OF PROCESSING RETURN TO SENDER MAILPIECES USING VOICE RECOGNITION

FIELD OF THE INVENTION

The invention disclosed herein relates generally to automated mail sorting and more particularly, a method of processing return to sender mail using an automated mailpiece sorting apparatus with integrated voice recognition.

BACKGROUND OF THE INVENTION

The processing and handling of mailpieces consumes an enormous amount of human and financial resources, particularly if the processing of the mailpieces is done manually. The processing and handling of mailpieces not only takes place at the Postal Service, but also occurs at each and every business or other site where communication via the mail delivery system is utilized. That is, various pieces of mail generated by a plurality of departments and individuals within a company need to be addressed, collected, sorted and franked as part of the outgoing mail process. Additionally, incoming mail needs to be collected and sorted efficiently to ensure that it gets to the addressee (i.e. employee or department) in a minimal amount of time. Since much of the documentation and information being conveyed through the mail system is critical in nature relative to the success of a business, it is imperative that the processing and handling of both the incoming and outgoing mailpieces be done efficiently and reliably so as not to negatively impact the functioning of the business.

Various automated mail handling machines have been developed for processing incoming mail (removing individual pieces of mail from a stack and performing subsequent actions on each individual piece of mail). Generally, the mail handling machines separate individual mailpieces from a stack, read the mailpieces using an optical character recognition (OCR) system and compare the read information to an addressee database in order to determine the appropriate destination points for delivery of the mailpieces. Some of the incoming mail received at a mailroom of the company can be unreadable by the OCR system, the quantity of which can be great since recipients cannot control the addressee format in which the incoming mail is received. Some of the unreadable mail could be, for example, mail which is not OCR readable "OCR rejects" (i.e. smeared or needs to be opened to determine addressee), "mystery mail" which mail with no particular addressee (i.e. mail addressed to a company or department only or mail with poor quality handwriting), or "research mail" (i.e. mail that can not be read by OCR but does not require opening for the operator to determine the addressee, including the situation where there are several potential addressees with the same name). The unreadable mail, which will be referred to generally as "reject mail" is expensive to process since it drains the resources of the mail room requiring additional time and labor for sorting and delivery.

Another type of mail which can be categorized as unreadable generally by incoming mail sorting apparatus is "return to sender" (RTS) since the addressee, in most cases, is not in the addressee database of the mail sorting apparatus. These mailpieces, absent additional processing, are typically delivered to the "OCR reject" bin.

Typical "return to sender" mail is marked with "return to sender" text and/or a graphics symbol. The graphics symbols applied to "return to sender" mail are not uniform or standard and are not applied to a standard location on "return to sender" mailpieces. For these reasons, there are challenges to recognizing the "return to sender" symbol on a mailpiece by using an OCR system. Thus, a typical OCR system configured to recognized text would need additional capabilities and additional "read regions" to recognize "return to sender" icon or markings.

Previously, if a determination could not be made by the incoming mail handling machine as to the addressee, a video image of the mailpiece was viewed by an operator and in the case where the addressee image was readable by the operator, addressee information was keyed into the system and associated with an identification number for the mailpiece. This is typically done after the unreadable mailpieces are sorted into a reject bin because it requires time to make the determination and provide the information to the system for proper sorting. The previously rejected mailpieces are then resorted by reading the identification information which can be printed on the mail during the first sort. The identification information is linked with the addressee information manually keyed in by the operator during the reject processing/video coding sequence and is used to sort the mailpiece to the proper destination bin.

Video processing of mailpieces has been performed at on-site video coding terminals or off-site video coding facilities where the video image is transmitted for determination of addressee by an operator. The information is then transferred back to the sorting apparatus. The software and hardware costs associated with video processing can be high because video coding requires additional computer systems, image servers and workstations. Additionally, licensing fees for video coding software can be expensive. Video coding can also be labor intensive because the operator has to input information using a keyboard. While predictive keying can be used, the operator is still bogged down with using his or her hands to input addressee information. With video coding, a separate video coding operator is needed in apart from the incoming mailpiece sorting apparatus operator in order to keep throughput on the sorting apparatus while processing rejects.

It would be helpful if the mailpieces for which an intended recipient has not been identified could be processed additionally, quickly and in an automated fashion so as to encumber fewer additional resources. One of the problems of the prior art is that a system is not available for quickly processing "return to sender" mailpieces. Another problem of the prior art is that a system is not available which produces higher throughput. Another problem of the prior art is that is can be expensive. Yet another problem of the prior art is that incoming mail handling machines do not include integrated "return to sender" processing. Therefore, a method of processing unreadable mailpieces is needed which integrates "return to sender" processing with the incoming mailpiece sorting apparatus at lower cost and with greater throughput.

SUMMARY OF THE INVENTION

This invention overcomes the disadvantages of the prior art by providing a method of processing "return to sender" mailpieces which can provide better throughput and be performed with lower cost. This in turn affords quicker mailpiece processing. The present invention is directed to, in general, automated mail sorting and more particularly, a method of processing "return to sender" mail using an automated mailpiece sorting apparatus with integrated voice recognition for "return to sender" processing. An operator reads sender information from "return to sender" mailpieces into the voice recognition system and places the mailpiece into the mailpiece sorting apparatus feed path for appropriate sorting.

The mailpiece sorting apparatus may generally comprise a feeder, a scanner, a mailpiece deliverer, a bin module with compartments or bins for receiving sorted mailpieces, optical character recognition system (OCR) for reading addressee information, a personal computer (PC) or microprocessor based system, recipient matching software and an addressee database. The mailpiece sorting apparatus of the present invention also comprises a voice recognition system.

In an embodiment of the present invention, mailpieces are sorted by the mailpiece sorting apparatus. Mailpieces that can be read properly by the mailpiece sorting apparatus OCR system are sent to their designated sort bins. Mailpieces that the mailpiece sorting apparatus OCR system determines to be "return to sender" mailpieces are sent to a "return to sender" bin. Once the sorting is completed, the "return to sender" mailpieces are processed using a voice recognition mode.

During the "return to sender" voice recognition mode, the feeder of the mailpiece sorting apparatus can be set to manual feed. This allows the operator to manually or hand feed individual mailpieces into the mailpiece sorting apparatus. A voice recognition software system which enables mailpiece addressee look-up is also activated. The operator obtains a "return to sender" mailpiece and determines the sender address segment. This sender address segment could be, for example, the sender last name, mail stop, department, building, or company. The characters for the proper address segment are spoken by the operator one at a time (single character input) into a microphone connected to voice recognition software. The voice recognition software interprets the characters and communicates the characters to recipient matching software. Alternatively, the operator could speak entire words identifying the addressee; this alternative could use voice recognition software programmed for name recognition rather than dictionary word (letter-by-letter) recognition.

Using the single character input embodiment, as each character is input into the voice recognition system, the voice recognition system narrows down the list of potential recipient matches in the mailpiece sorting apparatus addressee database. This continues until a sender is identified or no match can be made. If a match is made, the operator is given a visual or audio prompt to place the mailpiece into the mailpiece sorting apparatus feeder. The mailpiece sorting apparatus sends the mailpiece to the proper sort bin based on the sender identification performed by the matching software. If the sender could not be matched via the spoken characters, the operator is given a different visual or audio prompt by the mailpiece sorting apparatus and sets the piece aside for later disposition. An additional feature of the present invention tracks and calculates statistical information regarding the total number of "return to sender" mailpieces as compared to the total number of mailpieces sorted. A correlation may also be made of the information to the sender for chargeback purposes. The mailpiece sorting apparatus could generate report(s) detailing counts of the "return to sender" mailpieces as well as operator productivity measurements.

If the "return to sender" that were corrected by spoken characters can require further sorting passes after the voice entry processing, additional operations are needed to store the recipient information for the piece. During the first sort pass when the "return to sender" mailpieces are identified and collected, a bar code identification (ID) can be printed on "return to sender" mailpieces. The bar code data is unique to each piece. When the operator single feeds each rejected mailpiece after performing the voice entry correction described above, the mailpiece sorting apparatus OCR system reads the bar code ID on the mailpiece. The mailpiece bar code ID is then stored in conjunction with the recipient information from the recipient matching software in a special bar code ID/recipient file. The next time the mailpiece is sorted, the bar code ID is read. The bar code ID is used to deliver the mailpiece to the sender.

An advantage of the method of the present invention is that it provides higher throughput with minimal additional hardware, software and labor costs. Another advantage of the present invention is that it allows for additional automated processing. Another advantage of the present invention is that it allows for "return to sender" mailpiece processing without typing skills needed for video coding. Other advantages of the invention will in part be obvious and will in part be apparent from the specification. The aforementioned advantages are illustrative of the advantages of the various embodiments of the present invention.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
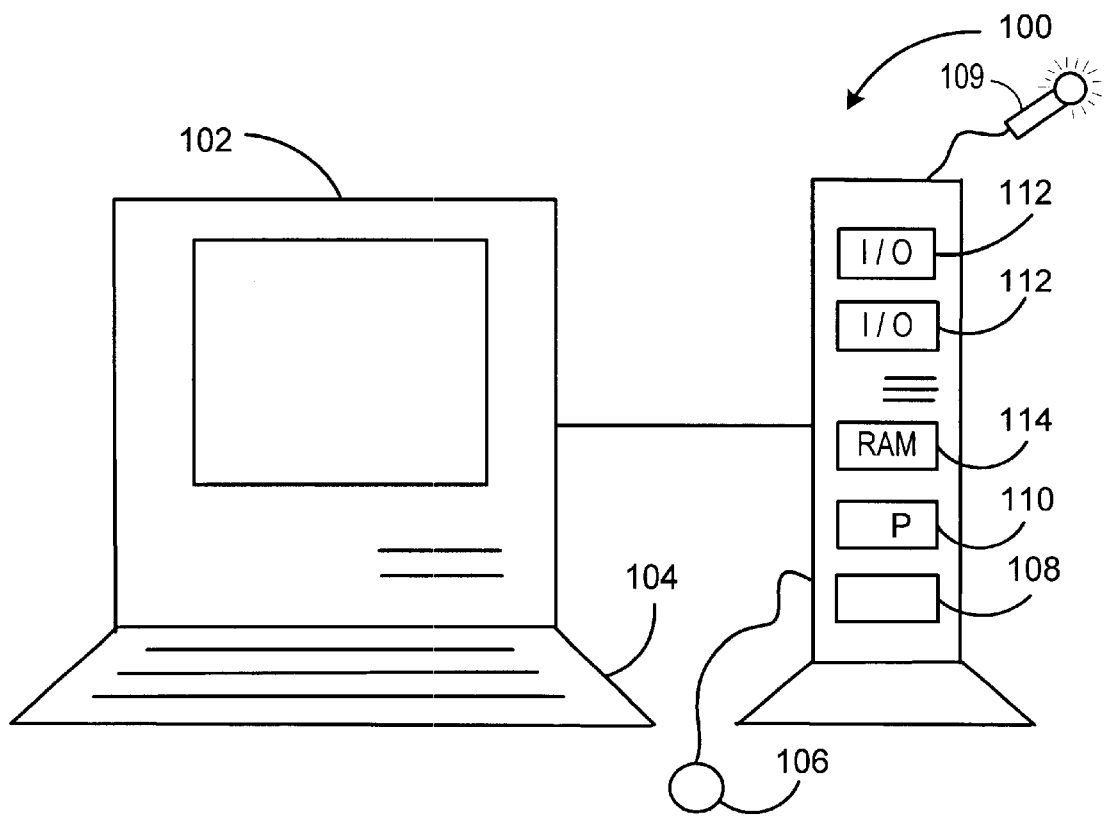
FIG. 1 is a block diagram that illustrates a computer system upon which an embodiment of the invention may be implemented.

In describing the present invention, reference will be made herein to FIGS. 1–5 of the drawings in which like numerals refer to like features of the invention. Features of the invention are not necessarily shown to scale in the drawings.

Hardware Overview

FIG. 1 is a block diagram that illustrates a computer system 100 upon which an embodiment of the invention may be implemented. Computer system 100 may be a personal computer which is used generically and refers to present and future microprocessing systems with at least one processor operatively coupled to user interface means, such as a display 102 and keyboard 104, and/or a cursor control, such as a mouse or a trackball 106, and storage media 108. An input device such as a microphone 109 can be included for use as a voice data input in conjunction with a voice recognition system (note shown). The voice recognition system may comprise the computer system 100, voice recognition software (note shown) such as, for example, DRAGON NATURALLYSPEAKING®, the microphone 109 and usually a sound card (not shown). The voice recognition system can be used in conjunction with the address database 22 (shown in FIG. 2) and recipient matching software (not shown). The personal computer 100 may be a workstation that is accessible by more than one user. The personal computer also includes a conventional processor 110, such as a Pentium® microprocessor manufactured by Intel, and conventional memory devices such as hard drive 108, floppy drive(s) 112, and memory 114.

Figure 2A:
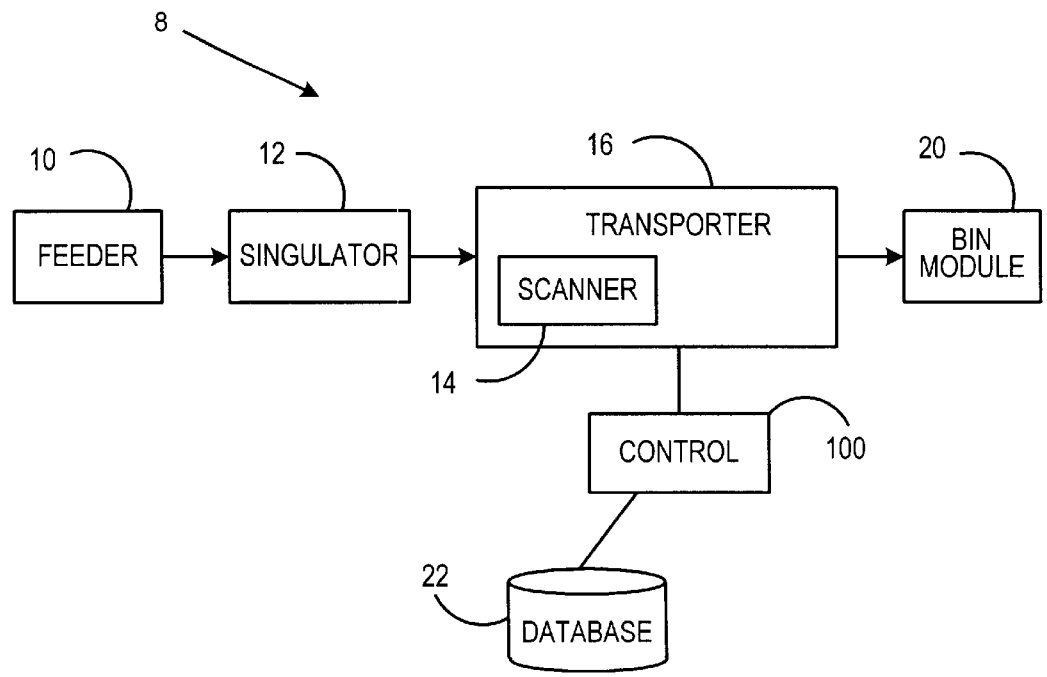
FIG. 2a illustrates the connection of the computer system to the sorting apparatus.
Figure 2B:
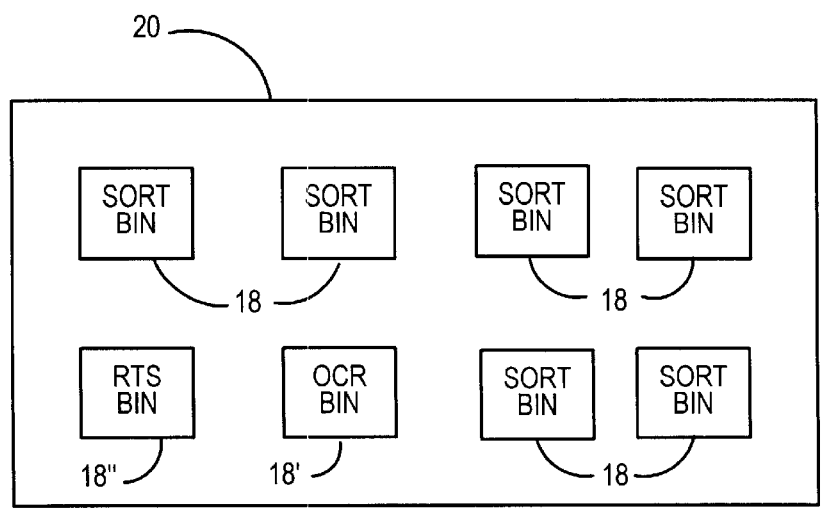
FIG. 2b is a block diagram illustrating an eight bin module which may be part of the mailpiece sorting apparatus which is used to perform an embodiment of the method of the present invention.

The computer system 100 can be connected to a sorting apparatus 8 as illustrated in FIG. 2a. The mailpiece sorting apparatus 8 may generally comprise a feeder 10, a line scan camera 14 (and OCR software, not shown), a mailpiece transporter 16, a bin module 20 (shown in FIG. 2b) with compartments or bins 18, 18', 18" for receiving sorted mailpieces 30 and a control system 24 which may be the microprocessor based personal computer system 100 described above. The computer system 100 includes appropriate memory devices 108, 114 for storage of information such as an address database 22. One of ordinary skill in the art would be familiar with the general components of the sorting apparatus upon which the method of the present invention may be performed.

The mailpiece sorting apparatus 8 and the OCR software may be used to determine the addressee of the mailpiece 30 or other information such as "return to sender" graphics printed on the face of the mailpiece 30. The reading of various information may be performed with the assistance of intelligent character recognition (ICR) or imaging and character recognition (OCR/IC) which may be part of the above mentioned OCR software and can read the various fields on the mailpiece 30. The microphone 109 and voice recognition software can be used for operator input of sender information from the face of the mailpiece 30, such as in the case of "return to sender" processing.

Reject Mailpieces

Figure 3A:
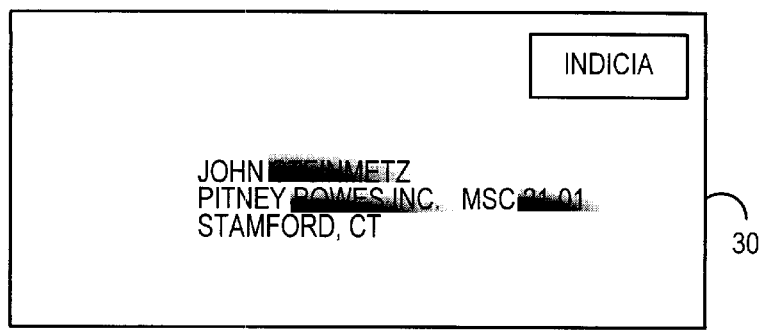
FIGS. 3a–3d illustrate various reject mailpieces.
Figure 3B:
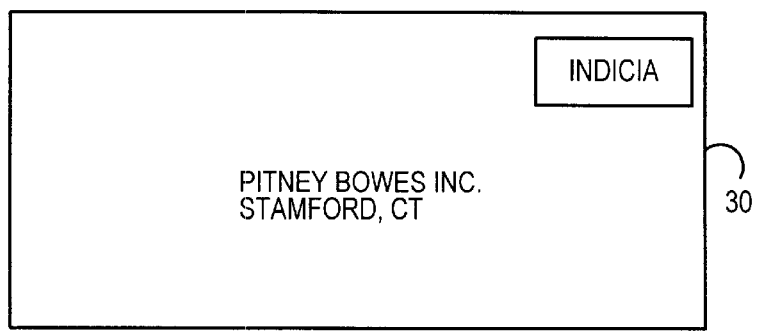

FIGS. 3a–3d illustrate various reject mailpieces 30. FIG. 3a is an example of a reject mailpiece 30 which is unreadable by the OCR system because the addressee information is smeared ("OCR reject"). In some instances, the addressee information can be smeared to the point where the operator would need to open the mailpiece 30 to determine the addressee. FIG. 3b is an example of a reject mailpiece 30 for which the intended individual addressee cannot be determined from the face of the mailpiece 30 because there is no individual addressee but rather a general address to the company, as in this example, Pitney Bowes Inc. ("mystery mail"). In the case of the mystery mail of FIG. 3b, the mailpiece 30 would need to be opened to determine the appropriate addressee. In another example, not shown, the mailpiece 30 could be addressed to a company and/or department and would need to be opened to determine the appropriate addressee.

Figure 3C:
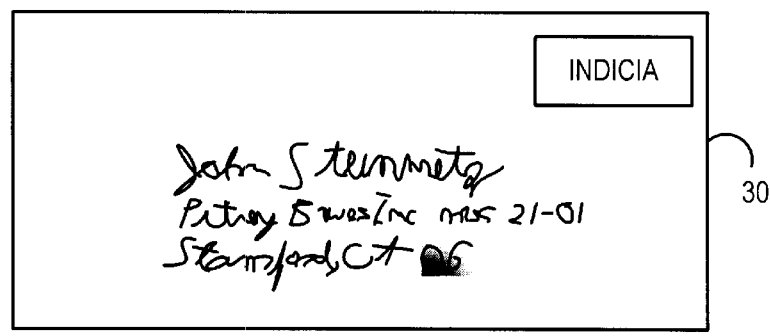

FIG. 3c is an example of mystery mail for which the intended individual addressee cannot be determined using OCR because the handwriting in the addressee segment is unreadable by the OCR ("mystery mail"). It should be noted that while some handwriting is readable by OCR systems, not all handwriting is automatically readable, especially handwriting where the character shapes are of poor quality and are poorly spaced such as, for example, some cursive writing as is illustrated on mailpiece 30 in FIG. 3c.

Figure 3D:
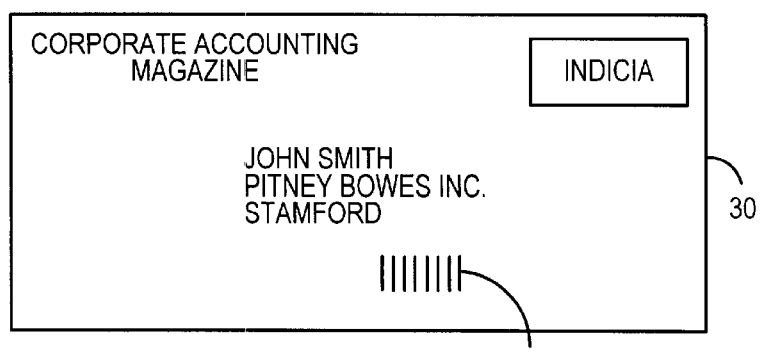

FIG. 3d is an example of a reject mailpiece 30 for which the operator can determine the appropriate addressee from the face of the mailpiece 30 (without opening the mailpiece 30) but for which the OCR system could not determine the appropriate addressee ("research mail"). In the example of FIG. 3d, the addressee database 22 contains two addressees named John Smith. The operator may be able to determine the appropriate addressee by reading the return address information. For example John Smith in accounting might get a mailpiece with a return address of a corporate accounting magazine, whereas John Smith of legal might get a mailpiece with a return address of a corporate counsel society. Thus, the mailpiece of FIG. 3d would be routed to John Smith of accounting and such information would be input by the operator using the voice recognition system.

Return to Sender (RTS) Mailpieces

Some reject mailpieces may be "return to sender" mailpieces. A mailpiece may be returned to the sender for a number of reasons, such as, 1) the addressee or intended recipient printed on the mailpiece 30 may not be accurate or complete enough for the post office (i.e. United States Postal Service (USPS)) to determine the intended destination; 2) the addressee or intended recipient may have moved and left no forwarding address; or 3) the addressee or intended recipient may have moved, left a forwarding address, but the time limit for the post office to forward their mailpieces may have expired.

The post office may mark the "return to sender" mailpiece as follows: 1) an image of a hand with a pointing finger and "Returned to Sender" inscribed within the hand; 2) text may show the post office returning the piece and the reason why it was returned; 3) the post office may put on a label with "Return to Sender" text and additional text indicating why the piece was not deliverable; and/or 4) the post office may draw a line through the recipient address and/or its POSTNET bar code. These RTS markings or labels may obscure part or all of the original addressee or intended recipient.

Figure 4A:
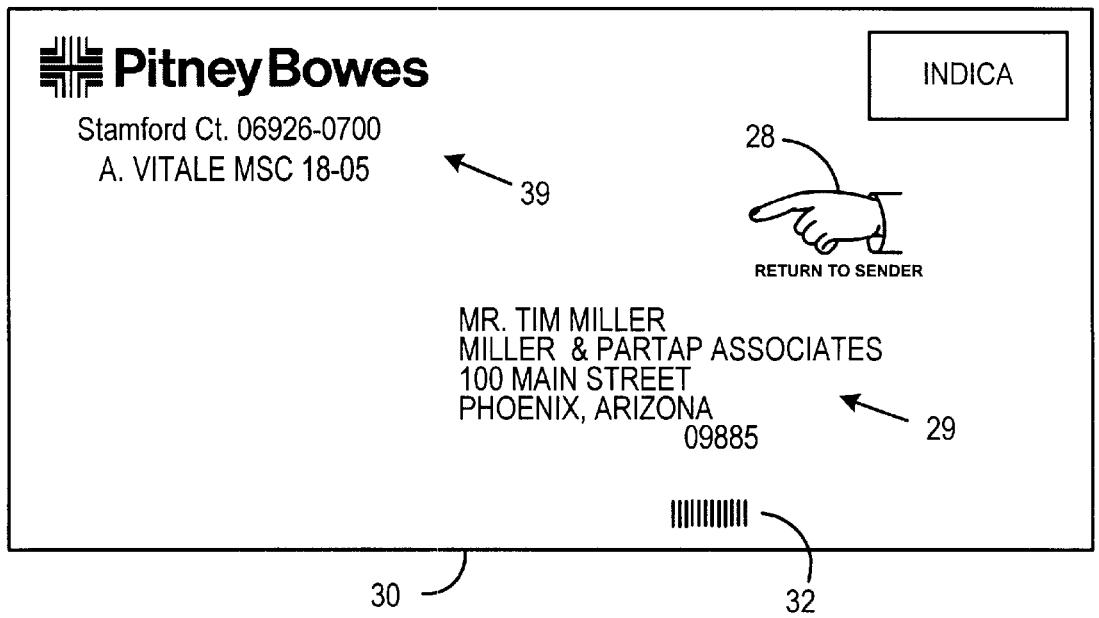
FIGS. 4a–b illustrates an exemplary "return to sender" mailpiece.

FIG. 4a illustrates an exemplary "return to sender" (RTS) mailpiece 30. The mailpiece 30 includes an image 28 of a hand with a pointing finger and "Return to Sender" inscribed within the hand. The exemplary mailpiece of FIG. 4 shows the addressee or intended recipient 29 "Mr. Tim Miller, Miller & Partap Associates, 100 Main Street, Phoenix, Ariz. 09885". In this example, the addressee or intended recipient has not been obscured by the USPS markings on the envelope. The return address or sender for the exemplary mailpiece is "Pitney Bowes, A. Vitale, MSC 18-05, Stamford, Conn. 06926-0700".

Figure 4B:
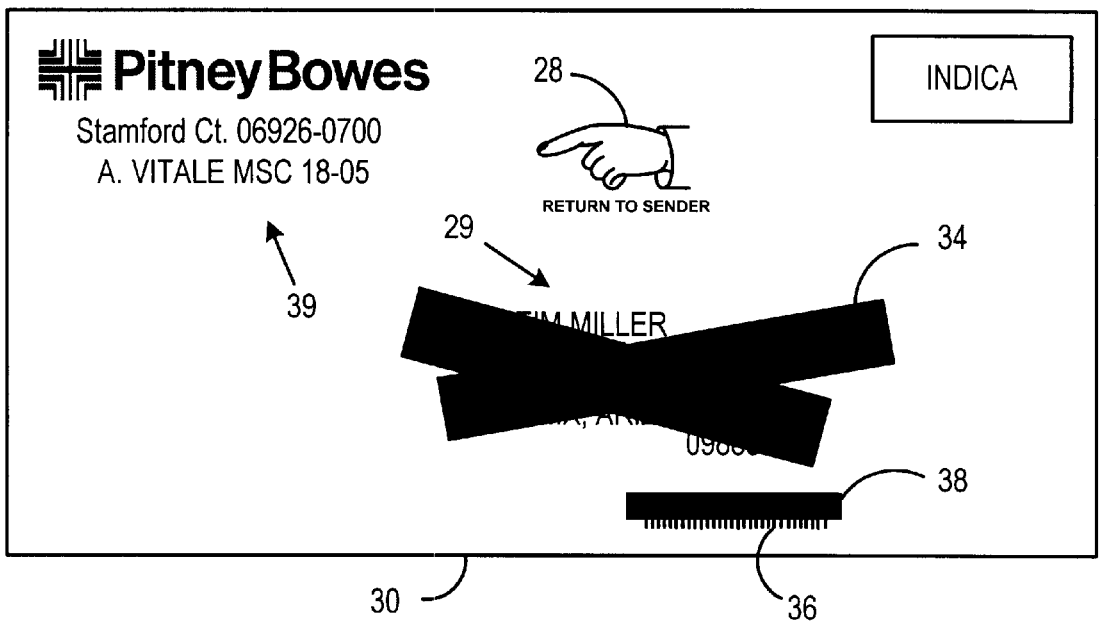

FIG. 4b illustrates an exemplary "return to sender" (RTS) mailpiece 30 where the addressee information has been obscured. The mailpiece 30 includes an image 28 of a hand with a pointing finger and "Return to Sender" inscribed within the hand. The exemplary mailpiece of FIG. 4b shows the addressee or intended recipient 29 "Mr. Tim Miller". In this example the addressee 29 (including ZIP Code and state have has been obscured by the USPS markings 34 on the envelope. The POSTNET barcode 36 has also been obscured by markings 38. The return address or sender 39 for the exemplary mailpiece is "Pitney Bowes, A. Vitale, MSC 18-05, Stamford, Conn. 06926-0700". The method of the present invention sorts "return to sender" mailpieces such as the envelope of FIG. 4b to the "return to sender" bin 18" (see FIG. 2b) using recognition by the OCR system of "return to sender" indicators or other methods as determined by one of ordinary skill in the art considering, for example, factors such as cost and accuracy.

Return to Sender Mailpiece Processing Using Voice Recognition

The present invention is related to the use of computer system 100 connected to the mailpiece sorting apparatus 8 for performing application software methods. The method of the present invention is used to process mailpieces 30 which are determined to be "return to sender" mailpieces.

Figure 5A:
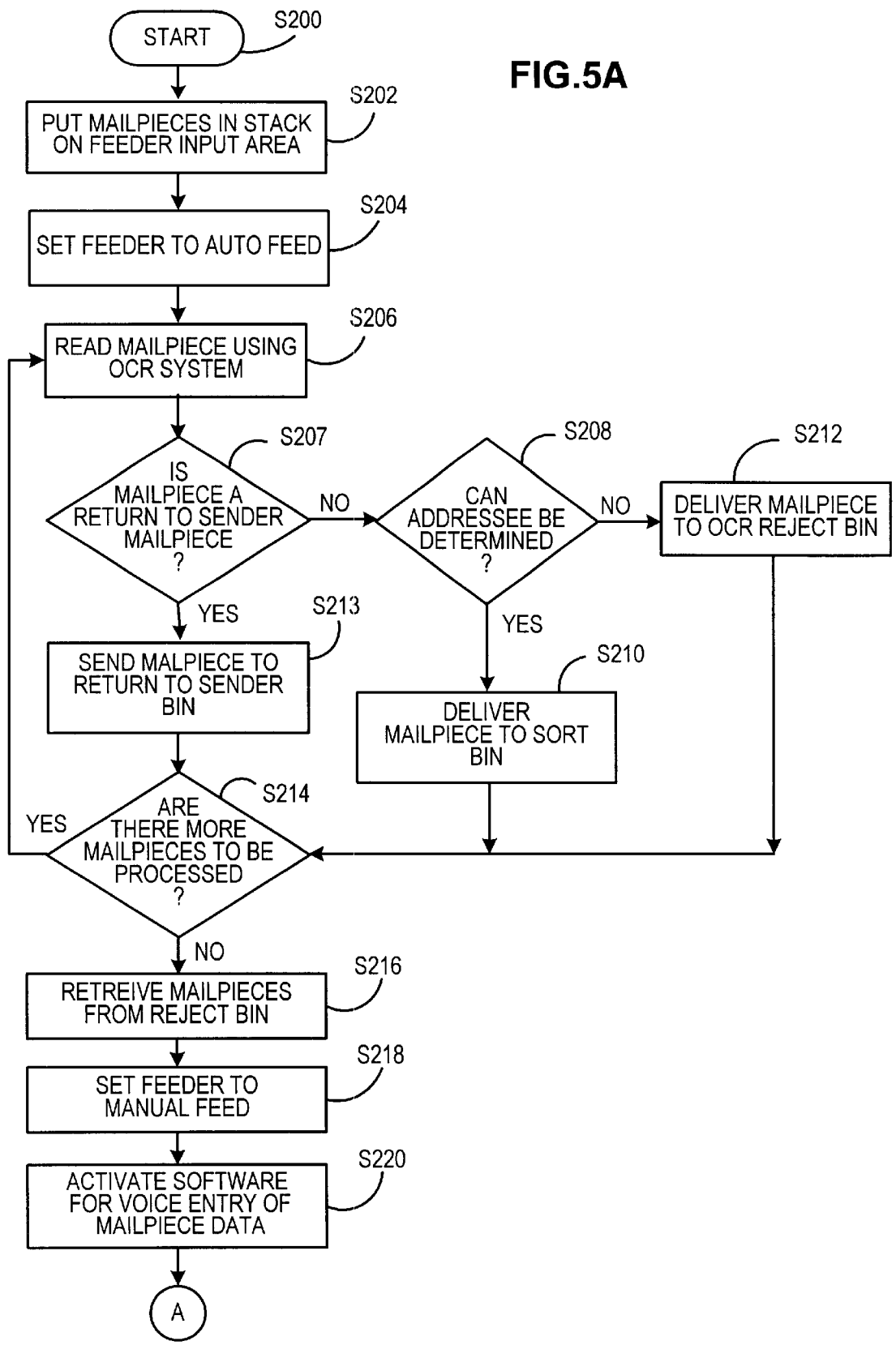
FIG. 5 is a flowchart of an embodiment of the method of processing unreadable mailpiece(s).
Figure 5B:
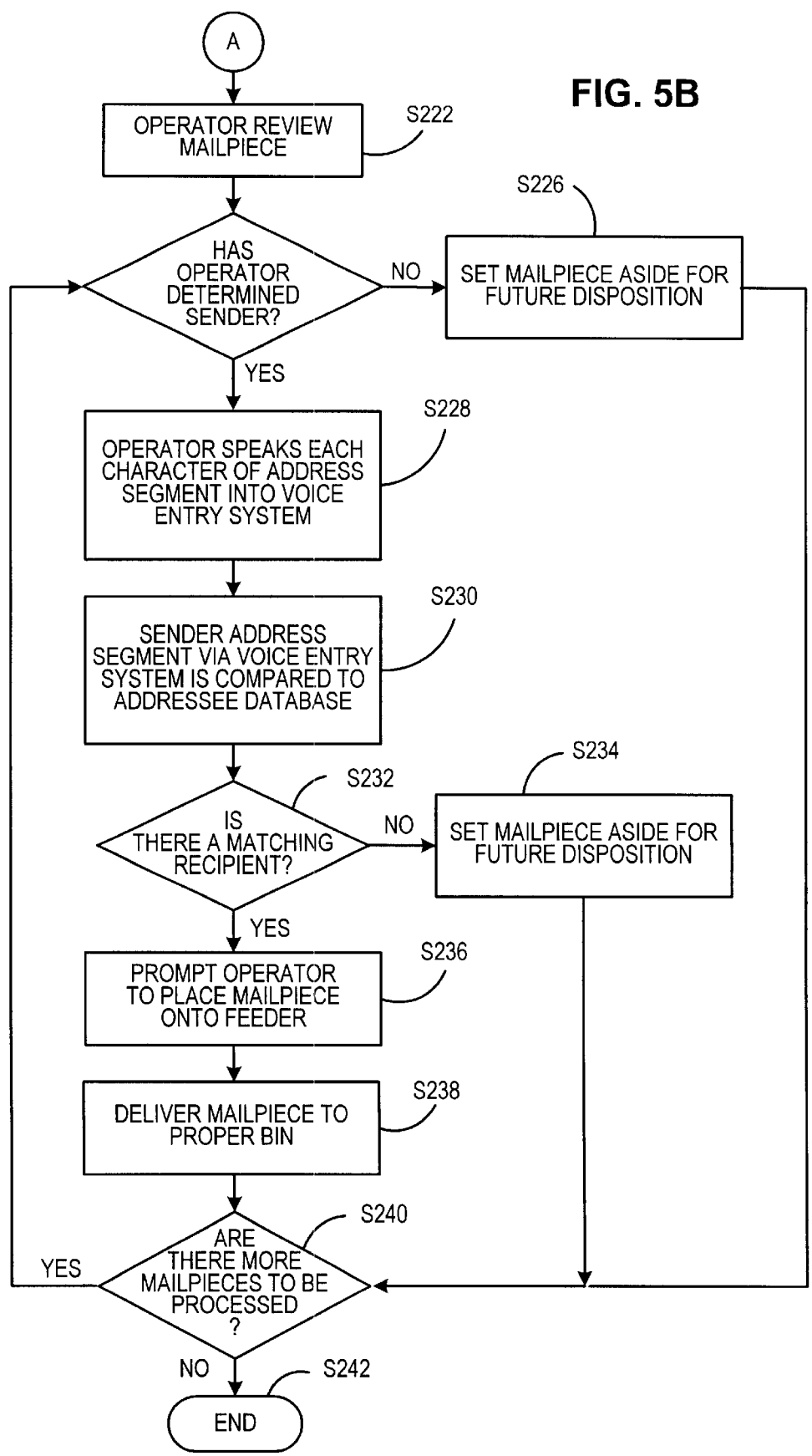

FIG. 5 is a flowchart of an embodiment of the method of processing unreadable mailpieces in a single sort pass scenario. At step S200 the method begins. At step S202 a stack of mailpieces (not shown) is placed on the feeder 10 of the mailpiece sorting apparatus 8. At step S204 the feeder 10 is set to auto feed. At step S206 the mailpieces 30 are read using the OCR system. At step S207 a query is made as to whether the mailpiece is a "return to sender" mailpiece.

The determination as to whether a mailpiece is a "return to sender" mailpiece may be made using various methods as determined by one of ordinary skill in the art considering, for example, cost factors. Typical "return to sender" mail is marked with "return to sender" text and/or a graphics symbol or the addressee information is obscured. An OCR system would need capabilities to read particular regions of the mailpiece ("read regions") to recognize "return to sender" icon or markings. Other sorting methods can be used by one of ordinary skill in the art to determine whether a mailpiece is a "return to sender" mailpiece.

If the answer to the query of step S207 is no, then at step 208 a query is made as to whether the addressee can be determined from the information read by the OCR system. If the answer to the query S208 is yes, then the mailpiece 30 is delivered to the appropriate sort bin 18 at step S210. If the answer to the query S208 is no, then the mailpiece 30 is delivered to a reject bin 18' at step S212.

Returning to the query of step S207, if the answer to the query of step S207 is yes, then at step S213 the mailpiece is sent to the "return to sender" bin. Next, a query is made at step S214 as to whether there are additional mailpieces 30 to be processed. If the answer to the query of step S214 is yes, then steps S206 through S214 are performed until no mailpieces 30 are left to be processed. The query of step S214 is also made after steps S210 and S212. If the answer to the query of step S214 is yes, then steps S206 through S214 are repeated until all the mailpieces have been processed.

If the answer to the query at S214 is no, then the process proceeds to step S216 and the mailpieces 30 are retrieved from the reject bin 18'. At steps S218 and S220, the feeder 10 is set to manual feed, and the voice recognition software is activated, respectively. At step S222 the operator reviews mailpieces 30 to determine the sender. This step can entail reading the sender information from the front of the mailpiece 30, opening the envelope to determine the sender or making a researched determination of the sender by information contained on or within the mailpiece 30. At step S224 a query is made as to whether the operator has determined the sender. If the response to the query S224 is no, then at step S226 the mailpiece 30 is placed in an area designated for future disposition.

If the response to the query S224 is yes, then the operator speaks sender information into the voice recognition system of the mailpiece sorting apparatus 8 at S228. The operator may speak a single character at a time or alternately may speak entire words at a time. The input by the operator is dependent upon the technology of the voice recognition software package that is used. For example, "discrete speech" software can be used to input information on a word-by-word basis, or continuous speech software can be used to input information that is spoken the way people usually speak-in fluent sentences. Generally, the voice recognition software comprises three parts: 1) a large electronic dictionary (e.g., such as Merriam-Webster); 2) a smaller active dictionary that reflects the user's own usage (i.e. words in the addressee database 22); and 3) a voice model. The voice model system, also called "speaker dependent" or "speaker independent". Speaker dependent systems can be used by individual speakers where the system is trained to recognized the speaker(s)' voice(s). Speaker independent systems have high recognition rates without training the system to recognize individual speakers voices. The type of voice recognition system used is dependent upon the features desired and the cost of the system. Low cost systems can be obtained for use in conjunction with mail sorting apparatus 8.

Returning to the flow chart of FIG. 5, the sender address segment input into the voice entry system is compared to the addressee database 22 at S230. The type of comparison performed by this step is dependent upon the type of voice recognition system that is being used. For example, if the operator is inputting a single character at a time into the voice system, the system may check for a matching addressee after each character is input. If the operator is inputting entire words at one time, the system may check for a matching addressee after each word is input. As is in the case of a single character input system, the operator picks up a another "return to sender" mailpiece and determines the address segment(s) needed to identify the sender. This might be the last name, mail stop, department, building, or company. The characters for the sender address segment are spoken by the operator one at a time into a microphone 109 connected to voice recognition software. The voice recognition software interprets the characters and sends them on to recipient matching software. As each character is received, the matching software narrows down the list of potential recipient matches in the database 22. This continues until a single recipient is identified or no match can be made.

At step S232 a query is made as to whether there is a matching recipient. If the answer to the query at step S232 is no, then the mailpiece 30 is set aside for future disposition at step S234. If the answer to the query of step S232 is yes, the operator is prompted to place the mailpiece 30 onto the feeder 10 (which was set to manual feed at step S218). The mailpiece 30 is fed into the mailpiece sorting apparatus 8 and delivered to the appropriate bin 18 (shown in FIG. 2b) at step S238. Next, a query is made at step S240 as to whether there are additional mailpieces 30 to be processed. If the answer to the query of step S240 is yes, then steps S224 through S238 are performed until no mailpieces 30 are left to be processed. The query of step S240 is also made after steps S226 and S234. If the answer to the query of step S240 is yes, then steps S224 through S238 are repeated until all the mailpieces have been processed.

In alternate embodiments of the present invention, "return to sender" mailpieces can be further processed (manually or by an automated method) to notify the sender of the mailpiece that the mailpiece was not deliverable. This can be done so that the sender can update the mailing list used to obtain the addressee information. In another embodiment the incoming mailpiece sorting apparatus could track and calculate statistical information regarding the "return to sender" mailpieces. The sender could be charged for the cost of sorting "return to sender" mailpieces.

The embodiments described herein can provide the advantages of higher throughput with minimal additional hardware and software costs. Another advantage of the present invention is that it allows for "return to sender" processing without need for special typing skills. The present invention provides for better throughput and decreased sorting costs. While the present invention has been disclosed and described with reference to a various embodiments thereof, it will be apparent, as noted above that variations and modifications may be made therein. It is, thus, intended in the following claims to cover each variation and modification that falls within the true spirit and scope of the present invention.

What is claimed is:

1. A method of sorting "return to sender" mailpieces using a mailpiece sorting apparatus having an Optical Character Reader (OCR) system, the mailpiece sorting apparatus comprising automatic reading area, a voice recognition system and a group of bins for receiving mailpieces, the method comprising the steps of:

a) automatically reading addressee information from a mailpiece using the mailpiece sorting apparatus;

b) determining whether an addressee can be determined from the information read from the mailpiece;

c) if the addressee cannot be determined from the addressee information read from the mailpiece determining whether the mailpiece is a return to sender mailpiece using recognition by the OCR system of return to sender indicators;

d) if the mailpiece is a return to sender mailpiece, delivering the mailpiece to a return to sender bin in the group of bins for receiving mailpieces;

e) retrieving the mailpiece from the return to sender bin in the group of bin for receiving mailpieces;

f) reading, by an operator, an identifiable sender address segment from the mailpiece;

g) speaking the identifiable sender address segment from the mailpiece into the voice recognition system;

h) comparing the identifiable sender address segment from the mailpiece to an addressee database in order to determine an appropriate bin for delivery; and i) if an appropriate bin for delivery is identified, delivering the mailpiece to the appropriate bin.

* * * * *